Feb. 27, 1968  K. J. IFIELD ETAL  3,370,603
SERVO-SYSTEM CONTROL VALVE
Filed Nov. 19, 1965  2 Sheets-Sheet 1
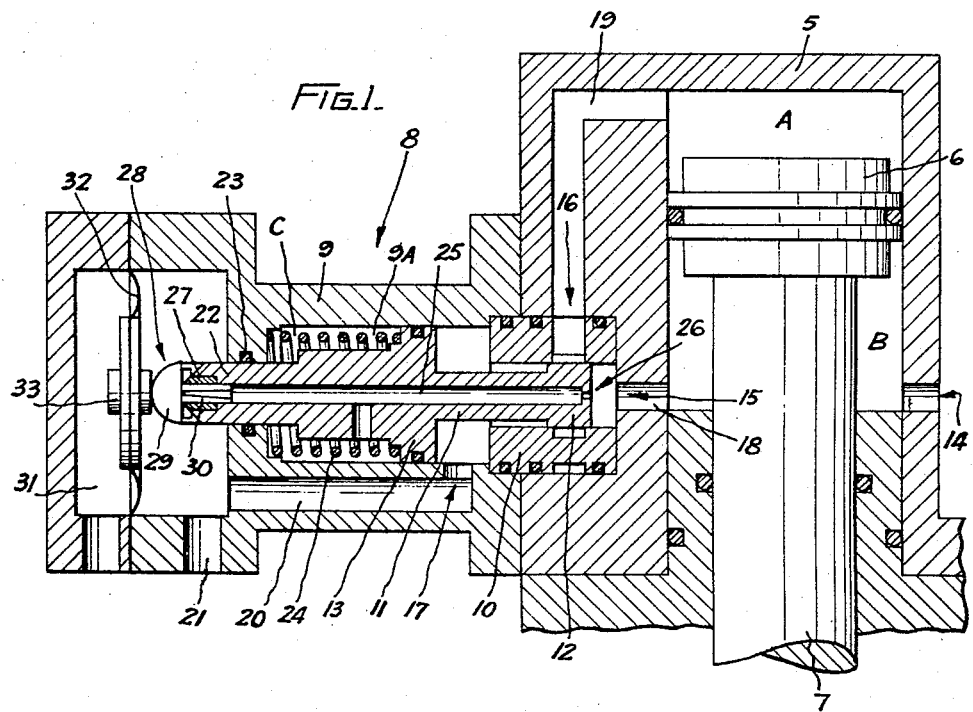
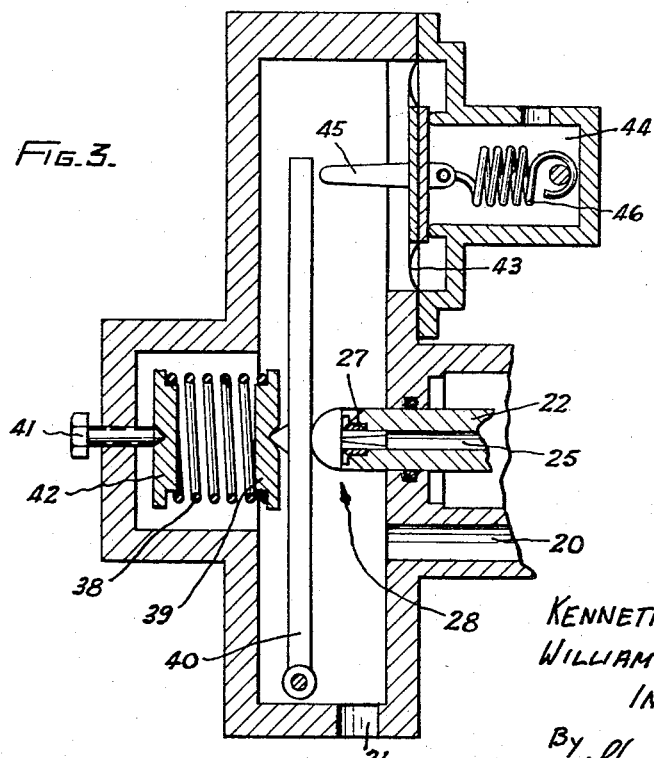
KENNETH J. IFIELD &
WILLIAM R. IFIELD,
INVENTORS.
By Stephen H. Frishauf
Atty

# United States Patent Office 3,370,603
Patented Feb. 27, 1968

3,370,603
SERVO-SYSTEM CONTROL VALVE
Kenneth John Ifield, Dural, near Sydney, New South Wales, and William Robert Ifield, Beecroft, near Sydney, New South Wales, Australia, assignors, by mesne assignments, to Joseph Lucas (Industries) Limited, Birmingham, England, a corporation of Great Britain
Filed Nov. 19, 1965, Ser. No. 508,868
Claims priority, application Australia, Nov. 24, 1964, 52,015
11 Claims. (Cl. 137—102)

ABSTRACT OF THE DISCLOSURE

A slidable spool-type valve element, for a servo-control valve, has a central bore to provide a bleed-duct to bleed fluid from an operating chamber, to control the pressure therein, the extent of bleed being controlled by a master valve element cooperating with a valve seat communicating with the duct. The master valve element can be spring or pressure loaded to control the bleeding characteristics of the valve, and thus the performance of the servo-control valve.

---

Figure 4:
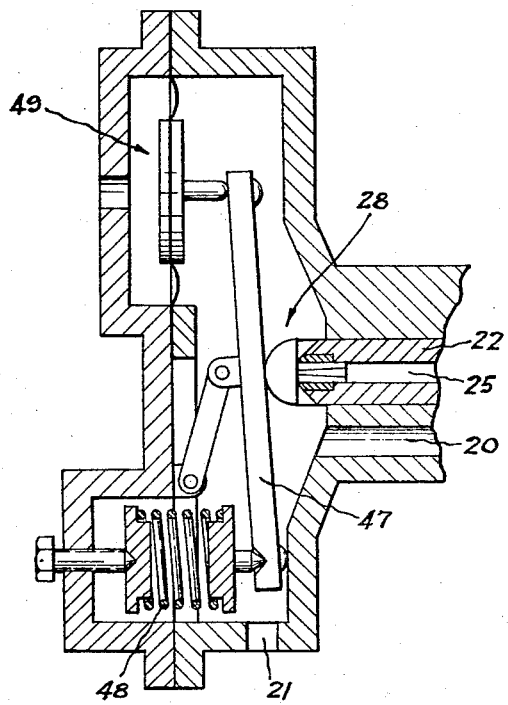

This invention relates to control valves of the kind used, for example, to control the fluid pressure in a fluid system by admitting fluid to the system from a pressure source when the system pressure is lower than required, exhausting fluid from the system when the system pressure is higher than required, or in most cases, effecting both the admission and exhaust of fluid to hold the system pressure within predetermined limits.

Valves of the kind to which the invention relates may also be used to control the flow of hydraulic fluid to and from a servo-motor or its equivalent in a closed loop servo-system. Indeed, the present invention was devised primarily with control valves for the latter purpose in mind and is described hereinafter primarily as applied to that purpose. In such cases the valve may be used to control the system pressure indirectly by controlling a servo-motor which itself acts to modify the system pressure.

When rapid response of a servo-motor is required spool-valves are commonly used because they may provide large flow passages; so enabling high rates of flow of operating fluid to or from the servo-motor. However, spool-valves as used heretofore, introduce undesirable hysteresis effects unless the spool is continuously rotated and in any event the spool is subjected to so called "Bernoulli forces" due to velocity gradients in the fluid flow. Those forces tend to produce undesirable nonlinear characteristics and unstabilising effects. On the other hand, seated valves, that is to say, valves of the kind in which a valve element is movable into contact with a valve seat rimming a flow orifice to close the valve, are virtually free of hysteresis and other undesirable effects but are not well suited for direct control of rapid response servo-systems.

With the foregoing in mind it has been proposed to use control valves comprising a slave valve, usually a spool-valve, which is hydraulically operated under the control of a seated master valve. In such prior known slave and master valve combinations a fluid operated slave valve (to control flow to the servo-motor) is opened and closed by a piston slidable in a cylinder and a seated master valve controls flow into and from the cylinder through a port in one or other of the cylinder walls and therefore controls the slave valve operating fluid pressure.

However, it has been found that in such known slave and master combinations the slave valve is not accurately phased to the master valve element, and this leads to unstable operation.

An object of the present invention is to provide a valve of the slave and master kind wherein the slave valve operates as one with the master valve element.

The invention consists in a control valve for the control of pressure in a fluid system comprising, in combination, a slave valve adapted to feed fluid into or exhaust fluid from the system or both and which is actuated by means of an operating element movable in response to an operating fluid pressure in an operating chamber, means to feed operating fluid into said operating chamber from a pressurised source of fluid and a master valve comprising a valve element and a coacting valve seat controlling the bleed of fluid from, and thus the operating pressure in, the operating chamber. The master valve seat is disposed on a control rod having a bleed duct and extending from the operating chamber, the control rod being linked to the operating element so as to move as one with or in concert with the operating element.

According to preferred embodiments of the invention the operating chamber and operating element are in the forms of a cylinder and piston respectively. Alternatively, the operating element may comprise a flexible diaphragm, or the like constituting a wall of the operating chamber.

In those instances in which the fluid in the fluid system is suitable for operation of the operating element it is preferred for the supply of operating fluid to the operating chamber to be by way of a duct connection to the system itself.

For simplicity the control rod, with its internal bleed duct is usually secured to or is integral with the operating element, but if desired the rod may be in driving connection with the operating element. In either case the bleed duct of the control rod is in communication with the interior of the operating chamber at one end and with the exterior thereof at its other end.

By way of example, several embodiments of the invention are described hereinafter with reference to the accompanying drawings.

FIG. 1 is a sectional diagrammatic view of a control valve according to the invention shown in operative association with a hydraulically operated servo-motor.

Figure 2:
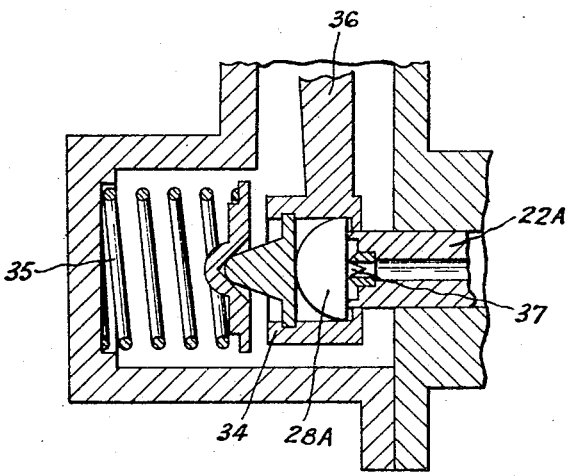

FIGS. 2, 3 and 4 respectively are diagrammatic cross-sectional views of portions of other forms of control valves according to the invention.

The embodiment of the invention illustrated by FIG. 1 is shown in operative association with a servo-motor comprising a servo-cylinder 5, a servo-piston 6 slidable therein and dividing the servo-cylinder bore into two servo-cylinder spaces A and B, and a piston rod 7 extending to the apparatus to be actuated by the servo-motor.

The servo-piston 6 moves in response to variations in hydraulic fluid pressure within the spaces A and B, and a control valve 8 according to the invention is provided to regulate those pressures.

The control valve 8 comprises a valve casing 9 part of which constitutes an operating cylinder 9A, a bush 10 inserted into one end of the casing 9 constituting a valve cylinder, and a spool comprising a spool body 11 with a valve piston 12 at one end and an operating piston 13 at the other end.

High pressure hydraulic fluid from any suitable source may be fed into the servo-cylinder 5 by way of an input port 14 so as to pressurise the space B.

Two ports are formed in the bush 10, namely a high pressure port 15, and an intermediate pressure port 16; these ports 15 and 16, and a low pressure port 17 in valve body 9 communicate with the valve cylinder space. The high pressure port 15 is connected by duct 18 to the space B for the inflow of hydraulic fluid at system pressure from the space B into one end of the valve cylinder. The intermediate port 16 is connected by duct 19 to the space A and the low pressure port 17 is connected by duct 20 to a fluid outlet 21 communicating with a sump or other low pressure fluid "sink."

The valve piston 12 has sufficient axial length completely to cover the intermediate port 16. Therefore, when the valve piston 12 is at the centre of the valve cylinder space no flow to or from space A may occur, but should the spool shift to the left (as seen in FIG. 1) to cause the valve piston 12 to move towards the inner end of the valve cylinder, high pressure fluid may flow from the valve cylinder through the intermediate port 16 and duct 19 into space A in the servo-cylinder so as to produce equal pressures on each side of the servo-piston 6. Due to the presence of the piston rod 7 the effective area of the face of the servo-piston 6 exposed to space A is greater than that of the servo-piston face exposed to space B and thus the equal pressures in spaces A and B will cause the piston 6 and rod 7 to move in one direction.

On the other hand, if the valve piston 12 shifts in the other direction from its mid-position then fluid may flow from the space A into the valve cylinder and then by way of the low pressure port 17 and duct 20 to the fluid outlet 21; so the pressure in space B would then shift the piston 6 in the other direction. Thus, the position of the valve piston 12 with respect to the intermediate port 16 determines whether the servo-motor will operate and if so in what direction.

A control rod 22 extends axially from the face of the operating piston 13 remote from the valve piston 12 through a gland in the wall of the casing 9 defining the outer end of the operating cylinder. That gland preferably includes sealing means, such as, for example, an O-ring 23 encircling the control rod 22 and housed within a peripheral groove formed in the bore of the gland so that a sealed operating chamber space C is defined between said wall and the operating piston 13. Therefore, the fluid within space C, which is also the free space of the operating cylinder 9A, acting on the operating piston 13 opposes the system pressure of the fluid acting on the valve piston 12. The effect of the fluid pressure in chamber C may be augmented by a helical compression spring 24 sleeved upon the control rod 22 with one end in contact with the said wall defining the outer end of the operating cylinder and its other end in contact with the operating piston 13. It will be appreciated that other conventional means to apply a yieldable load to the spool may be used.

The fluid in chamber C, at a pressure which is termed the operating pressure herein, may be supplied by means of a duct 25, forming a bleed tube, extending through the spool body 11 from a small flow restricting orifice 26 in the outermost face of the valve piston 12 and a cross bore, as seen in FIG. 1.

The duct 25 continues into the bore of the control rod 22 which at its outer end is rimmed by a sharp-edged valve seating 27 adapted to coact with a master valve element 28.

The valve element 28 may be a hemisphere 29 with a stem 30 extending perpendicularly from, and centrally of, the flat or valve face of the hemisphere 29.

The stem 30 is a neat sliding fit within the bore 25 of the rod 22 and serves to locate the valve element 28 with respect to the seating 27. The stem 30 may have one or more flats (or grooves) formed on (or in) it to constitute fluid passageways through which fluid may escape from the bleed tube 25 when the hemisphere 29 is spaced from the valve seating 27.

In view of the flow restricting orifice 26 the operating pressure is determined by the rate of leakage of fluid from the outer end of the bleed tube 25 thus the operating pressure is determined by the loading of the face-type valve element 28 towards the seating 27. That is to say the master valve operates as a relief valve to determine the maximum operating pressure.

The loading on the valve element 28 may be determined by means of a control pressure established within a pressure chamber 31 acting upon a resilient diaphragm 32 carrying an abutment 33.

Generally speaking, the control pressure acting on the flexible diaphragm 32 tends to hold the master valve element 28 in contact with the coacting master valve seat 27 until such time as an increase in system pressure produces sufficient operating pressure to overcome the effect of the control pressure on the diaphragm 32. The valve element 28 then moves from the seat 27 until a balance between the operating and control pressures is achieved.

If desired, suitable loading springs may be provided to augment the effect of the operating pressure on the diaphragm 32.

According to other examples of the invention such loading springs may be used instead of the pressure chamber and diaphragm arrangements described immediately above.

It will also be appreciated that although a flexible diaphragm is a convenient way of providing a loading on the valve element 28 from a controlled primary control pressure, flexible bellows, a slidable piston or other suitable means may also be employed for that purpose.

The example of the invention illustrated in FIG. 1 may be used, for example, for controlling the delivery pressure of a high pressure pump, in which the servomotor is connected to control the pump delivery pressure. The fluid inlet 14 is connected to the pump's delivery port and the outlet 21 to the pump's intake port. Automatic control of the pump's delivery pressure may be effected by mounting the face type valve element 28, in a movable cage which is spring or otherwise loaded towards the end of the rod 22 so that the operating pressure is limited, by being balanced against that loading as explained above. The position of the spool then will be determined by the pump delivery pressure on one hand and by the operating pressure and spring loading on the spool on the other hand; an increase in pump delivery pressure moves the spool to admit high pressure fluid to the servo-motor which would then operate, to reduce the pump's delivery pressure.

FIGS. 2, 3 and 4 all illustrate master face-type valves and their operating arrangements according to further examples of the invention which otherwise may be the same as the example described above with reference to FIG. 1. Therefore those components shown in FIGS. 2, 3 and 4 which correspond to previously described components shown in FIG. 1 bear corresponding reference numerals but are not further described.

FIG. 2 illustrates an arrangement wherein a face-type valve element 28A in a cage 34 is urged by a loading spring 35 towards a control rod 22A. The cage 34 is secured to one end of a lever 36 which is able to swing about an axis remote from the element 28A.

As the valve element 28A is located by the cage 34 there is no need for it to have a stem corresponding to the stem 30 of the FIG. 1 embodiment of the invention. However, if desired, a tapered needle 37 may be provided to modify the opening rate of the master valve.

In some applications of a variable displacement fluid pump, it is desired not only to maintain a constant working pressure, but also to set an upper limit to some other condition such as the pump speed, output flow, or driving torque. In such instances a mechanical governor or a control pressure responsive to the desired other limitation may be provided to provide a second limitation to the operating pressure or to override the first limitation thereof.

Thus, if a control valve according to the invention is to be used so to control the servo-motor actuating such a variable displacement fluid pump, the arrangements for actuating the master valve element may comprise a loading spring therefor similar to that described above with reference to FIG. 2 but with an overriding control able to open or close the master valve at the predetermined other limitation.

An example of such an arrangement is shown in FIG. 3 wherein a face-type valve element 28 is loaded towards control rod 22 by means of a loading spring 38 acting upon a spring seat 39 in contact with a freely swinging arm 40. The extent to which the spring 38 is compressed may be determined by means of an adjustment screw 41 able to shift a second spring seating 42. However, an overriding control as discussed above is provided by means of a flexible diaphragm 43 closing a pressure chamber 44 and an abutment 45 secured to the diaphragm 43.

A diaphragm loading spring 46 normally maintains the abutment 45 clear of the swinging arm 40 but when the predetermined limiting condition occurs fluid under pressure may be admitted from any suitable source into the pressure chamber 44 so as to flex the diaphragm 43 and cause the abutment 45 to bear against and swing the swinging arm away from the face-type valve element 28 so as to permit leaking of fluid from duct 25 and consequent operation of an appropriate servo-motor.

FIG. 4 illustrates an arrangement somewhat similar to that of FIG. 3 but wherein the two controls may effect the operation of the face-type valve simultaneously. In this instance the loading on the face-type valve element 28 is transmitted through a rocking arm 47, the loading on the valve element being determined by whichever of a loading spring 48 at one end of the arm and a pressure chamber, diaphragm and abutment combination 49 at the other end has the lesser effect at the time being.

While the examples of control referred to above are practical applications of the invention, it is not confined to such applications and may be used quite generally to control fluid system pressures.

Also, the type of servo-piston illustrated at FIG. 1 is one in which an annular area is subject to the supply pressure 14 and a larger area is subject to the servo-pressure in the chamber A. In some servo-systems the two areas are substantially equal and it is necessary to employ two valve pistons on the spool valve to cause the pressure in one chamber to rise and the pressure in the other chamber to fall.

There are other cases in which a spool valve may be required to control more than one servo-system and a plurality of valve pistons may be required on the spool valve; such spool valves are known and may be used as the slave valve of control valves according to the invention.

Finally, it should be mentioned that master valve elements may be used which differ from the flat faced element illustrated in the drawings. In particular the master valve may have a ball or a conical poppet or the like as its movable element.

We claim:

1. A control valve for the control of pressure in a fluid system comprising a slave valve adapted to feed fluid into or exhaust fluid from the system of both, means actuating said slave valve comprising means forming an operating chamber, means supplying operating fluid, under pressure, to said chamber, an operating element movable in response to fluid pressure of said operating fluid in said operating chamber, master valve comprising a valve element and a coacting valve seat controlling the bleed of fluid from, and thus the operating pressure in, the operating chamber, and a control rod movable with said operating element and extending from said operating chamber, said master valve seat being fixedly associated with said control rod so as to move in concert with the operating element.

2. A control valve according to claim 1 wherein said operating chamber is a cylinder and said operating element is a piston slidable therein.

3. A control valve according to claim 1, wherein the master valve element has a substantially flat valve face with which the master valve seat coacts.

4. A control valve acording to claim 1, wherein said control rod is formed with a fluid bleeding duct, and the master valve element has a tapered needle extending into the duct of said control rod to modify the opening rate of the master valve.

5. A control valve according to claim 1 including means loading said master valve element towards said master valve seat.

6. A control valve according to claim 5 wherein said loading means comprises a loading spring acting on the master valve element to load said valve element towards the master valve seat.

7. A control valve according to claim 5 wherein said loading means comprises a pressure chamber adapted to hold a charge of fluid at a control pressure; a movable wall forming one side of said chamber; and means to transmit the pressure loading on said wall to the master valve element to load the master valve element towards the master valve seat.

8. A control valve according to claim 7 wherein said movable wall comprises a flexible diaphragm.

9. A control valve according to claim 7 wherein said means to transmit the pressure loading comprise an abutment carried on said movable wall.

10. A control valve according to claim 5 wherein said loading means comprises a rocker arm located to bear against said valve element, and means applying control forces at spaced apart locations thereof.

11. A control valve according to claim 10 including a loading spring and a pressure chamber having a movable wall to contain a fluid under pressure therein, said loading spring and said fluid under pressure bearing against said movable wall supplying said control forces.

References Cited

UNITED STATES PATENTS

| | | | |
|---|---|---|---|
| 2,333,522 | 11/1943 | Clifton | 137—491 |
| 2,351,871 | 6/1944 | Parker | 137—491 |
| 2,836,153 | 5/1958 | Dyson | 137—625.61 |
| 3,105,508 | 10/1963 | Bowditch et al. | 137—102 XR |
| 3,167,632 | 1/1965 | O'Connor | 137—625.61 XR |

HENRY T. KLINKSIEK, *Primary Examiner.*